United States Patent [19]

Sjöberg et al.

[11] 4,363,376

[45] Dec. 14, 1982

[54] DEVICE ON A MOTOR-DRIVEN VEHICLE TO DETECT AN OBSTACLE IN THE WAY OF THE VEHICLE DURING BACKING

[76] Inventors: Åke L. Sjöberg; Per E. Sjöberg, both of Torsdagsgränd 15, S-302 53 Halmstad; Frans B. Sjögren, PL 109 11 Vilshärad, S-305 90 Halmstad, all of Sweden

[21] Appl. No.: 229,573

[22] PCT Filed: May 14, 1980

[86] PCT No.: PCT/SE80/00142

§ 371 Date: Jan. 15, 1981

§ 102(e) Date: Jan. 15, 1981

[87] PCT Pub. No.: WO80/02539

PCT Pub. Date: Nov. 27, 1980

[30] Foreign Application Priority Data

May 18, 1979 [SE] Sweden ............... 7904367

[51] Int. Cl.³ .............................. B60T 7/12
[52] U.S. Cl. ........................ 180/275; 188/2 R
[58] Field of Search .............. 180/275, 274, 169; 239/284 A, 284 R; 188/2 R

[56] References Cited

U.S. PATENT DOCUMENTS

| 2,588,815 | 3/1952 | Fasolino | 180/275 |
| 3,423,026 | 1/1969 | Carpenter | 239/284 R |
| 3,664,701 | 5/1972 | Kondur | 180/275 X |
| 3,923,330 | 12/1975 | Viall, Sr. et al. | 180/275 X |
| 3,986,577 | 10/1976 | Ebbesson et al. | 180/275 |
| 4,146,107 | 3/1979 | Ebbeson et al. | 180/275 |

FOREIGN PATENT DOCUMENTS 2502389 7/1976 Fed. Rep. of Germany ... 239/284 A

Primary Examiner—Robert R. Song
Assistant Examiner—Michael Mar
Attorney, Agent, or Firm—Laurence R. Brown

[57] ABSTRACT

A device on a vehicle to activate its brake system on the presence of an obstacle behind the vehicle during backing. Holders (7) project backwards from the vehicle with members (9, 10) for transmitting and receiving light. If the beam of light is interrupted, the vehicle is braked.

In order to keep members (9, 10) free of dirt etc. air lines (5) directed towards them are connected to the quick-emptying valve (2) of the vehicle.

2 Claims, 2 Drawing Figures

DEVICE ON A MOTOR-DRIVEN VEHICLE TO DETECT AN OBSTACLE IN THE WAY OF THE VEHICLE DURING BACKING

TECHNICAL FIELD

The present invention relates to a device on a motor-driven vehicle to detect an obstacle in the way of the vehicle during backing, the device having holders projecting backwards from each outer edge of the rear portion of the vehicle, one of which encloses a transmitter of pulsating light (light-emitting diode), or transmitter and receiver of such light, and the other a receiver or reflector. On an interruption in the beam of light the brake system is activated.

PRIOR ART

Through U.S. Pat. No. 4,146,107 a device is known on vehicles with a compressed-air system for activating the brake system when a sensor detects an obstacle in the way of the vehicle.

The technical effect which the device proposed in this patent possesses naturally presupposes a reliable sensor.

In the patent literature several different proposals are known for detecting members, adapted to activate a compressed-air brake system of the vehicle via an operating member to stop the vehicle when the member detects an obstacle in the way of the vehicle. In many cases the detecting members are of a mechanical type acted upon on direct contact with the obstacle, as is shown for example in U.S. Pat. No. 2,588,815 or 3,986,577. It is also known to utilize ultrasonics to detect obstacles. Likewise it must be regarded as obvious to anyone skilled in the art to consider the use of the principle of so-called pulsating light, either through a separate transmitter and a separate receiver or using reflected light.

All the said types of sensors suffer from such defects, however, that the invention disclosed in U.S. Pat. No. 4,146,107 has not hitherto found practical use.

Sensors of the kind shown in the above-mentioned U.S. Pat. No. 2,588,815, that is to say metallic detecting members, are deformed already by a backing onto of a minor nature. As to means of a yielding nature, such as a rubber strip according to U.S. Pat. No. 3,986,577, the risk of penetrating condensate and dirt with consequent short-circuiting of the electrical system is obvious. As to ultrasonics the effect with this method in the present state of the art is uncertain.

Finally, so far as the use of the photocell art is concerned, this otherwise advantageous alternative has generally been avoided hitherto because of the exposed placing of the optical system, with such rapid soiling that the system very soon ceases to operate.

It may also be pointed out here that no sensor is known in the patent literature adapted to be used as a detecting member for motor-driven implements and the like vehicles, which have the rear pair of wheels outside the actual profile of the body.

THE INVENTION

The object of the present invention is to render possible the practical use of a pulsating (infrared) beam of light as a sensor. This object is according to the invention achieved in that directed towards the transmitter as well as the receiver is an air line which—fed with outflowing air from at least one of the quick-emptying valves of the vehicle—on a braking operation delivers a blast of air towards both the transmitter and the receiver, or towards the transmitter/receiver and the reflector. By this means both are kept free of frost and snow, dirt, salt deposits and other obstacles to the beam, which would otherwise make the use of the photocell method impossible.

With regard to motor-driven implements, the object is achieved partly in the manner now given with regard to the portion of the rear part of the vehicle which is limited by the side profiles of the body, partly as a result of the fact that fastened to the holders are rods which, on detecting an obstacle, act on one or both holders causing them to bend so that the beam of light originating from the transmitter does not impinge on the receiver.

THE DRAWING

The invention is described in more detail below with reference to the accompanying drawing in which FIG. 1 shows—partially cut away—the rear portion of a vehicle, type wheel loader, and FIG. 2 in a top view shows the rearmost part of the same vehicle.

DESCRIPTION OF A PREFERRED EMBODIMENT

Figure 1:
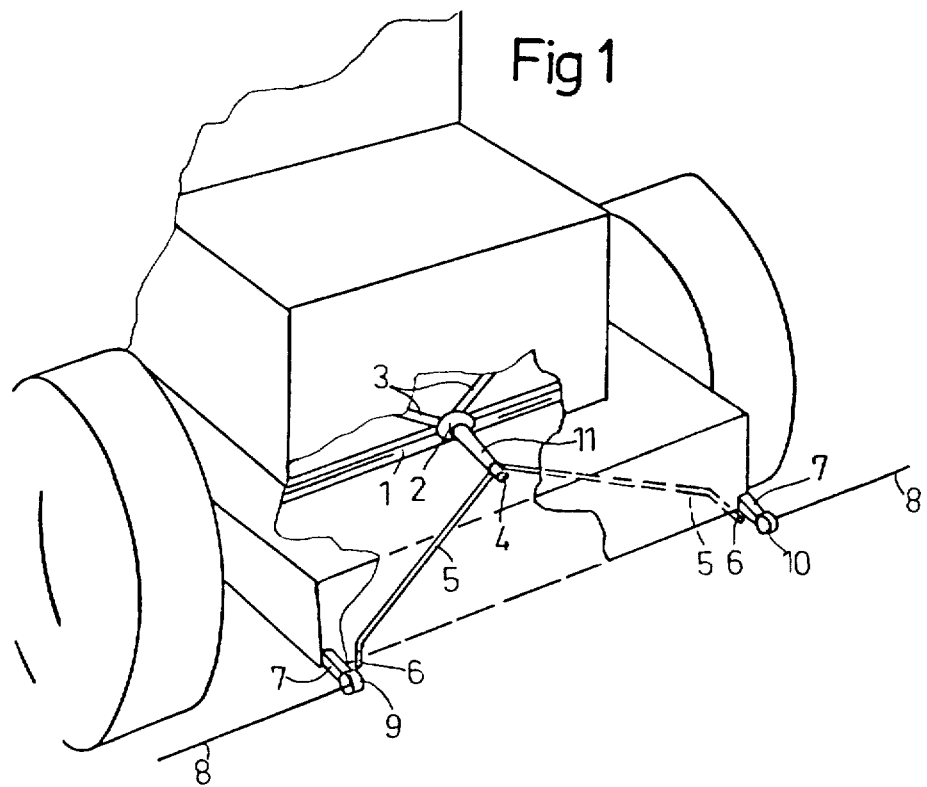
Figure 2:
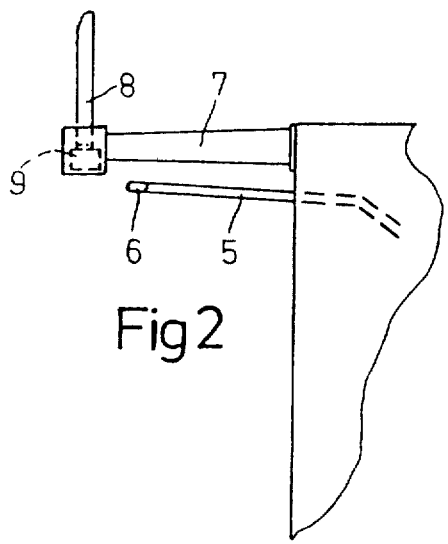

On the rear axle 1 of a vehicle there is a quick-emptying valve 2, which in a known manner after each braking operation serves to empty the air, which at a brake application flows to the service brake system, not illustrated, of the vehicle. The outflowing air comes from the service brakes to the valve 2 via pipes 3. Around the valve opening, which is normally adapted to discharge the air into the atmosphere, is fixed an air line 11 with a T-pipe 4, from which two air hoses 5 extend obliquely backwards towards the outermost rear portions of the vehicle. Projecting from said portions are holders 7, preferably of a resilient material, which enclose, at one side, a light-emitting diode 9 to transmit pulsating light and at the other side of the vehicle, a photodiode 10 to receive the transmitted beam of light. Fixed to the same holders 7 are rods 8 of a suitable material, such as glass fibre, which project from the vehicle to the line of the side profiles of the rear wheels. The outermost part of each air hose 5 is directed towards the transmitter/light-emitting diode 9 and the receiver/photodiode 10 respectively and can be provided with a nozzle 6 to increase the effect.

When the vehicle is travelling, immediately after each operation of the brake pedal, a blast of air is directed towards the transmitter 9 and the receiver 10. As a result of this, these are kept free of dirt and anything else which would otherwise prevent the transmitted light from reaching the receiver 10 with the intended effect.

When backing takes place and there is an object between the two holders 7, the beam of light is interrupted; the receiver 10 reacts to this and delivers a pulse to a valve unit, constructed in manner non per se and described in U.S. Pat. No. 4,146,107. The vehicle stops.

When backing takes place and there is an object behind either of the two rods 8, this bends the outer portion of the holder 7, which surrounds the transmitter 9 or receiver 10. The result of this is that the beam of light does not reach the receiver 10 and the same braking effect is achieved as stated above.

The invention should not be regarded as limited to what is described above and shown on the drawing but can be modified in various ways within the scope of the following claims. Thus instead of a separate transmitter 9 and a separate receiver 10, a photocell can be used with both transmitter and receiver on the one holder 7 and a reflector on the other; the rods 8 can be formed so that they follow the side profile of the vehicle with spacing from this etc.

We claim:

1. On a motor-driven vehicle having air brakes and quick-emptying brake valves releasing air on a braking operation a device to detect an obstacle in the way of the vehicle during backing, the device comprising in combination holders projecting backwards from each of the outer edges of the rear portion of the vehicle, one of which includes a transmitter for transmitting a pulsating light beam and one of which includes a receiver of such light beam, and means for mounting said transmitter and receiver on at least one of said holders for conveying the pulsating light beam between the holders for actuating said vehicle brakes when backing of the vehicle takes place and the light beam between said holders is interrupted by an obstacle external to said vehicle, means directed toward both holders comprising an air line fed with outflowing air from at least one of the quick-emptying valves of the vehicle on a braking operation for delivering a blast of air towards the holders to keep them free of dirt and the like which prevents transmission of the light beam between the holders.

2. A device as claimed in claim 1, characterized in that fixed to the holders are rods which, on detecting said obstacle, act on at least one of said holders for bending it so that said light beam is not conveyed between the holders.

* * * * *